(12) United States Patent
Drosendahl et al.

(10) Patent No.: US 7,413,041 B2
(45) Date of Patent: Aug. 19, 2008

(54) CHILDREN'S RIDE-ON VEHICLES HAVING IMPROVED MOTOR ASSEMBLIES

(75) Inventors: Steven Robert Drosendahl, Orchard Park, NY (US); Jeffrey W. Reynolds, East Aurora, NY (US)

(73) Assignee: Mattel, Inc., El Segundo, CA (US)

( * ) Notice: Subject to any disclaimer, the term of this patent is extended or adjusted under 35 U.S.C. 154(b) by 134 days.

(21) Appl. No.: 11/341,034

(22) Filed: Jan. 27, 2006

(65) Prior Publication Data

US 2006/0175101 A1 Aug. 10, 2006

Related U.S. Application Data

(60) Provisional application No. 60/649,702, filed on Feb. 2, 2005.

(51) Int. Cl.
*B60K 1/00* (2006.01)

(52) U.S. Cl. .................. 180/65.1; 180/65.5; 446/454

(58) Field of Classification Search ............ 180/65.1, 180/65.3, 65.5, 65.8, 6.5, 6.66; 310/86, 261, 310/239, 90; 439/188, 97, 123; 320/134, 320/136; 446/454, 457, 90
See application file for complete search history.

(56) References Cited

U.S. PATENT DOCUMENTS

| 4,114,047 A | 9/1978 | Melocik |
|---|---|---|
| 4,634,941 A | 1/1987 | Klimo |
| 5,337,013 A | 8/1994 | Langer et al. |
| 5,510,658 A | 4/1996 | Nakayama |
| 5,534,364 A | 7/1996 | Watanabe et al. |
| 5,678,646 A | 10/1997 | Fliege |
| 5,816,358 A | 10/1998 | Adler et al. |
| 5,928,020 A | 7/1999 | Bishop, Jr. et al. |
| 5,942,819 A * | 8/1999 | Burgess et al. ............... 310/51 |
| 6,188,154 B1 * | 2/2001 | Luedtke et al. ............ 310/68 C |
| 6,222,282 B1 | 4/2001 | Rossi et al. |
| 6,377,026 B1 | 4/2002 | Crofut et al. |
| 6,556,778 B2 | 4/2003 | Zhang et al. |
| 6,677,693 B2 * | 1/2004 | Ooyama ..................... 310/239 |
| 6,814,549 B2 * | 11/2004 | Kimberlin et al. ............ 310/90 |
| 6,837,688 B2 * | 1/2005 | Kimberlin et al. ............ 417/32 |
| 6,847,140 B2 * | 1/2005 | Kimberlin et al. ............ 310/86 |

* cited by examiner

*Primary Examiner*—Hau V Phan
(74) *Attorney, Agent, or Firm*—Kolisch Hartwell, P.C.

(57) ABSTRACT

Children's ride-on vehicles having improved motor assemblies. The vehicles are reduced-scale vehicles, often formed substantially from molded plastic, that are sized for use by children and which include battery-powered motor assemblies. The vehicles may include a noise-suppression device that is adapted to reduce electromagnetic noise, a cutoff device that is adapted to selectively restrict operation of the motor assembly, or both devices. In some embodiments, the cutoff device may be a temperature-sensitive cutoff device and/or a current-sensitive cutoff device. In some embodiments, the device is disposed within a motor housing provided with the vehicle.

31 Claims, 5 Drawing Sheets

CHILDREN'S RIDE-ON VEHICLES HAVING IMPROVED MOTOR ASSEMBLIES

RELATED APPLICATIONS

The present application claims priority to U.S. Provisional Patent Application Ser. No. 60/649,702, which was filed on Feb. 2, 2005, and the complete disclosure of which is hereby incorporated by reference for all purposes.

TECHNICAL FIELD

The present disclosure relates generally to children's ride-on vehicles, and more particularly to battery-powered children's ride-on vehicles and electric motor assemblies for use with such vehicles.

BACKGROUND OF THE DISCLOSURE

Children's ride-on vehicles are reduced-scaled vehicles that are designed for use by children. For example, children's ride-on vehicles include a seat adapted to accommodate one or more children and steering and drive assemblies that are adapted to be operated by a child sitting on the seat. One type of drive assembly that is often used in children's ride-on vehicles includes a battery-powered motor assembly that is adapted to drive the rotation of one or more of the vehicle's wheels. Typically, the vehicle will include an actuator, such as a foot pedal, push button or other user input device, which enables a child to select when power is delivered to the motor assembly. Some drive assemblies further include other user input devices, such as a speed selector and/or a direction selector, which are operated by a child sitting on the vehicle's seat to select the speed and/or direction at which the vehicle travels.

DETAILED DESCRIPTION AND BEST MODE OF THE DISCLOSURE

Figure 1:
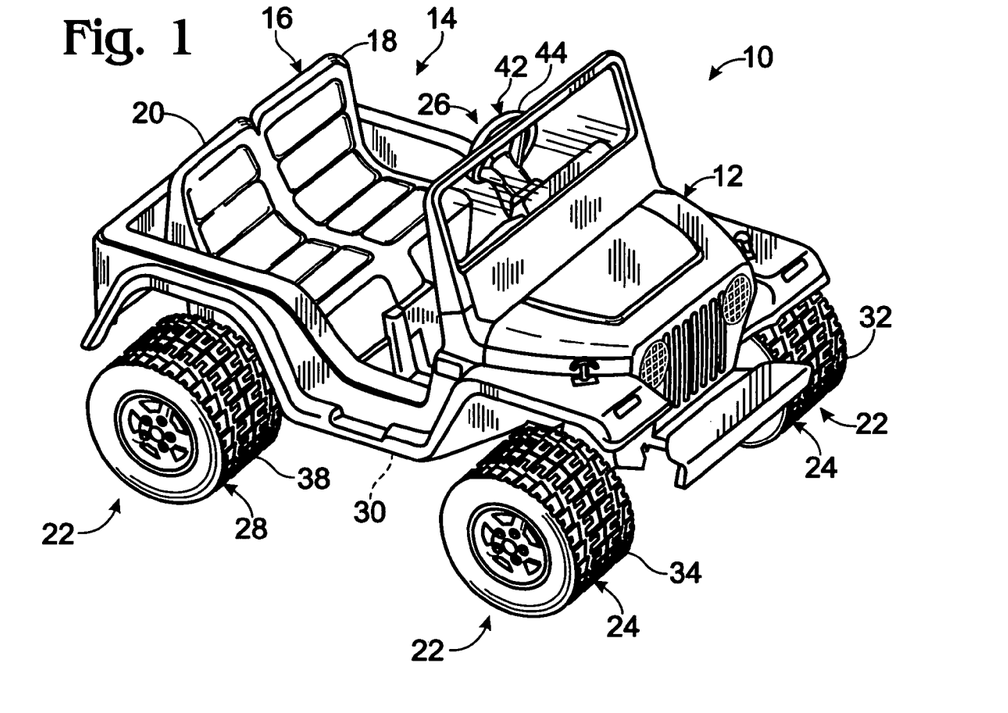
FIG. 1 is an isometric view of an illustrative example of a children's ride-on vehicle.

An illustrative example of a children's ride-on vehicle is shown in FIG. 1 and indicated generally at 10. Ride-on vehicle 10 includes a support frame, or body, 12 that provides a riding space, or passenger compartment, 14 with a seat assembly 16 that is sized and configured to accommodate at least one child, including a child driver. Seat assembly 16 may be integral with or otherwise mounted on body 12 and may have any suitable configuration, including configurations in which the position of the seat assembly is adjustable within the passenger compartment, and configurations in which the seat assembly includes two or more seats or two or more seating regions. Typically, vehicle 10 will be sized for use by a child driver or by a child driver and a child passenger. For example, in the illustrated embodiment, seat assembly 16 includes a pair of seats, or seating regions, 18 and 20, with seat 18 sized and positioned to receive a child driver and seat 20 sized and positioned to receive a child passenger.

Body 12 typically is formed from molded plastic and may be integrally formed or formed from a plurality of parts that are secured together by screws, bolts, clips or other suitable fasteners. Body 12 may additionally, or alternatively, be at least partially formed from other suitable material(s), such as metal, wood, or composite materials. Body 12 may include an underlying frame on which a chassis is mounted. In such an embodiment, the frame is often formed of metal and/or molded plastic, with the chassis typically formed of molded plastic.

As shown, body 12 is shaped to generally resemble a reduced-scale Jeep® vehicle. JEEP is a registered trademark of the Diamler Chrysler Corporation, and the JEEP mark and designs are used by permission. Children's ride-on vehicles according to the present disclosure may be shaped to generally resemble any type of vehicle. Examples of suitable vehicles are reduced-scale, or child-sized, vehicles that are shaped to resemble corresponding full-sized, or adult-sized, vehicles, such as cars, trucks, construction vehicles, emergency vehicles, off-road vehicles, motorcycles, space vehicles, aircraft, watercraft and the like. However, it is also within the scope of the present disclosure that vehicle 10 may be shaped to resemble fantasy vehicles that do not have a corresponding adult-sized counterpart. Although vehicle 10 is depicted in the form of a reduced-scale Jeep® vehicle, it will be appreciated that the components and/or features of vehicle 10 may be configured for use on any type of children's ride-on vehicle having one or more powered components.

Figure 2:
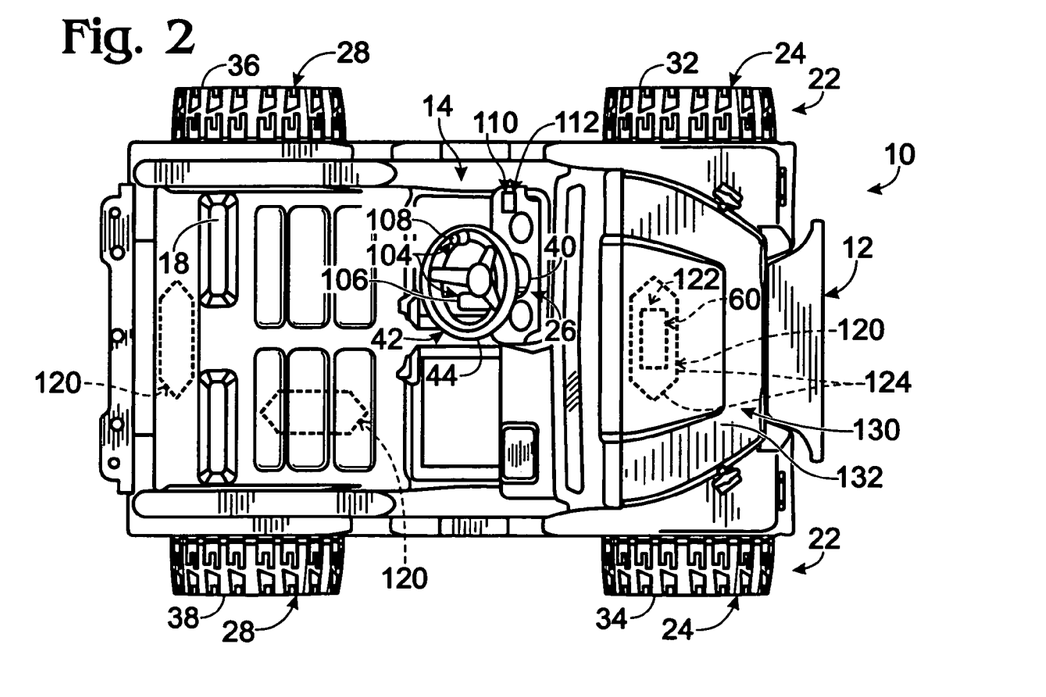
FIG. 2 is a top plan view of the children's ride-on vehicle of FIG. 1.

Body 12 also includes a plurality of wheels 22 that are rotatably coupled to body 12, as indicated in FIGS. 1-2. The plurality of wheels includes a steerable wheel assembly 24 that contains at least one steerable wheel that is adapted to be steered by the vehicle's steering assembly 26, typically at least partially in response to user-imparted steering inputs thereto. The plurality of wheels further includes a driven wheel assembly 28 that contains at least one driven wheel that is adapted to be rotationally driven by the vehicle's drive assembly 30. As used herein, the term "driven wheel" refers to a wheel that is rotated directly in response to a rotational input from the vehicle's drive assembly, which is either directly conveyed to the wheel by the output of the motor assembly or conveyed through a linkage, such as a gearbox, belt, chain, gear assembly, axle, or the like. In the illustrated embodiment, vehicle 10 includes four wheels 22, with front wheels 32 and 34 forming steerable wheel assembly 24, and rear wheels 36 and 38 forming driven wheel assembly 28. The number of wheels on the vehicle may vary from two wheels to four, six or more wheels, although children's ride-on vehicles typically include at least three wheels for stability. Similarly, each wheel assembly must contain at least one wheel, and a particular wheel may form all or a portion of both the steerable wheel assembly and the driven wheel assembly. For example, it is within the scope of the disclosure that either or both of front wheels 32 and 34 or rear wheels 36 and 38 are driven and steerable. Similarly, one front wheel and one rear wheel may be driven and/or steerable, or the vehicle may include one or more driven or steerable wheels underneath its body that are generally hidden by the body of the vehicle.

A portion of the vehicle's steering assembly 26 is shown in FIGS. 1 and 2 and includes a steering column 40 (indicated in FIG. 2) and a steering mechanism 42. The steering assembly enables a child sitting on seat 18 to steer the vehicle's steerable wheel assembly 24 via user-applied steering inputs to steering mechanism 42, which is positioned on vehicle 10 for operation by a child sitting on seat 18. In the illustrated embodiment, steering mechanism 42 takes the form of a steering wheel 44. Other suitable structures, such as handlebars and steering levers may be used and are within the scope of the present disclosure. Steering column 40 includes any suitable mechanical linkage that conveys a child's steering inputs from the steering mechanism to the vehicle's steerable wheel assembly, thereby steering the vehicle.

Figures 3, 4:
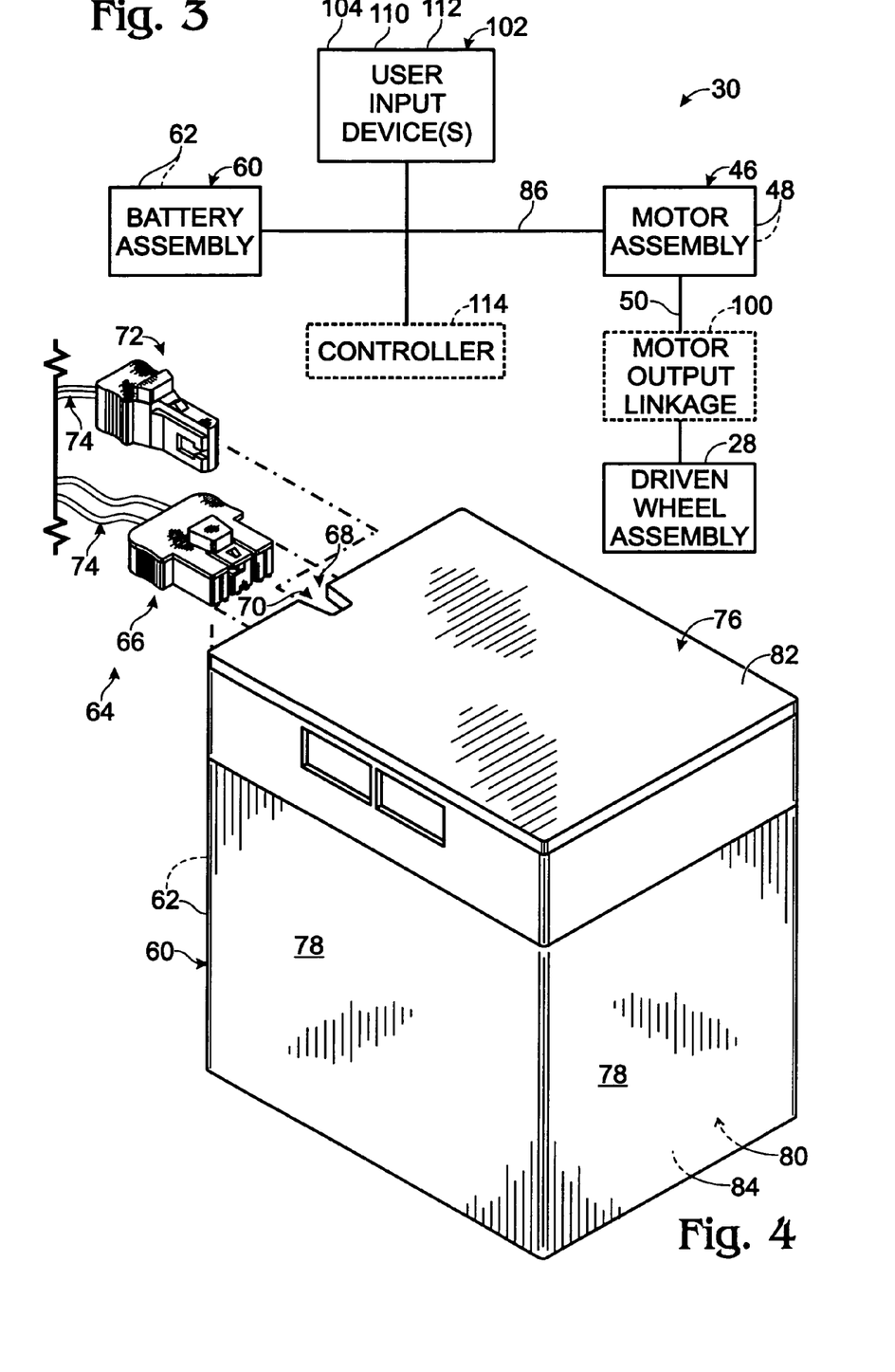
FIG. 3 is a schematic diagram of a suitable drive assembly for a children's ride-on vehicle, such as the vehicle of FIG. 1.
FIG. 4 is an isometric view of an illustrative battery assembly with portions of the vehicle's wiring harness and a charger shown in fragmentary.

In FIG. 3, an example of a suitable drive assembly 30 for a children's ride-on vehicle, such as vehicle 10, is schematically illustrated. Drive assembly 30 is adapted to drive the rotation of driven wheel assembly 28. The drive assembly includes a motor assembly 46, which includes at least one electric motor 48 that is adapted to drive the rotation of at least one of the plurality of wheels. The motor assembly includes an output 50 that provides a rotational input to the driven wheel assembly. Typically, the output 50 from each of the one or more motors includes a rotating shaft and/or a rotation pinion or output gear. Output 50 may include more than one shaft, pinion, and/or gear, such as when motor assembly 46 includes more than one motor and/or when driven wheel assembly 28 includes more than one driven wheel. Motor assembly 46 may also be configured to power other moveable components on vehicle 10, such as depending on the form of the vehicle. For example, the motor assembly may be coupled to raise and lower the blade of a ride-on that resembles a bulldozer, the bucket of a ride-on that resembles a skid-steer or other loader, the bed of a ride-on that resembles a dump truck, etc.

Power for the motor assembly is provided by any suitable power source. An illustrative example of a suitable power source is a battery assembly 60. Battery assembly 60 includes at least one battery, or cell, 62 that is adapted to provide power to the motor assembly. Any suitable type and number of batteries may be used in battery assembly 60. Although not required, the batteries are typically rechargeable batteries. For example, one or more six-, twelve-, eighteen-, or twenty-four-volt batteries have proven effective. An illustrative example of a battery assembly 60 is shown in FIG. 4. Also shown in FIG. 4 is a connector assembly 64 to transmit power from the battery assembly to the motor assembly. Thus, the motor assembly is operably connected to the battery assembly by any suitable electrical connectors, such as cables, wires, or positive and negative terminals or leads, and the like. In the exemplary battery assembly shown generally in FIG. 4, the connector assembly includes a plug 66 that fits into a socket 68 that is electrically connected to the battery assembly. The battery assembly 60 may optionally include a charging jack 70 that is configured to receive a charging probe 72. The plug and probe connect to wires, or electrical cables, 74 that transmit electrical power from the battery assembly to the motor assembly. It is within the scope of the present disclosure that vehicle 10 may include any other suitable structure for conducting electrical power from the battery assembly to the motor assembly, with the battery assembly of FIG. 4 merely providing an illustrative example. For example, it is within the scope of the present disclosure that the battery assembly may include an electrical connector, such as a plug or socket, that extends from the housing of the battery assembly and is electrically connected thereto by lengths of wires.

In FIG. 3, drive assembly 30 is shown further including an optional motor output linkage 100 that mechanically interconnects the motor assembly with the driven wheel assembly. Motor output linkage 100 is any suitable mechanism that transmits the rotational input from the motor assembly's output(s) to the driven wheel assembly. Examples of suitable linkages 100 include an intermediate linkage between the output and the driven wheel assembly, such as a gearbox containing one or more gears, a belt or chain drive, a worm gear, one or more individual gears, and the like. The motor output linkage may be adapted to transmit the rotational input from the motor assembly to the driven wheel assembly at the same relative rate of rotation, or it may mechanically augment the rotational input to convey a greater or lesser rate of rotation relative to the rate of rotation of the output of the motor assembly. It is also within the scope of the disclosure that drive assembly 30 may be formed without motor output linkage 100, in which case the output(s) 50 of the motor assembly directly transmit the rotational input to the driven wheel assembly.

Drive assembly 30 also includes one or more user input devices 102 that are adapted to convey inputs from a child sitting on seat 18 to the drive assembly. User input devices 102 also may be referred to as user control devices. These devices convey a user's inputs, such as via the vehicle's wiring harness 86, and affect the actuation of the motor assembly, such as by causing the actuation (or energization) of the motor assembly, selecting between a range of electronic configurations, selecting the direction of rotation of the motor assembly's output, selecting the relative degree of a maximum rate of rotation to which the motor assembly is actuated, etc. Examples of suitable devices 102 include a drive actuator 104, through which a user input directing the battery assembly to energize the motor assembly is received. Examples of suitable drive actuators 104 include an on/off switch, a foot pedal, a throttle lever, and a rotational handgrip on a steering mechanism that includes a handlebar. In FIG. 2, an example of a drive actuator 104 is shown in the form of a foot pedal 106 positioned for actuation by a child sitting on seat 18. When drive actuator 104 takes a form other than a foot pedal, it may be located in any suitable location within or near passenger compartment 14 so that a child sitting on seat 18 may reach the actuator while positioned to operate the vehicle. For example, an on/off switch or throttle may be located on the body or on the steering mechanism, such as illustrated at 108 in FIG. 2.

As schematically illustrated in FIGS. 2 and 3, other examples of user input devices 102 include a speed switch 110, which enables a user to select the relative rate of rotation of the motor assembly's output 50, and a direction switch 112, which enables a user to select the relative direction (i.e., clockwise or counterclockwise) of rotation of output 50 and thereby configure the vehicle to drive in forward and reverse directions. Switches 110 and 112 may be located in any suitable location on body 12 or steering assembly 26 for actuation by a child sitting on seat 18. An example of a suitable speed switch 110 is a switch that selectively configures a pair of batteries between series and parallel configurations to define relative "high" and "low" speed configurations. Speed switch 110 may additionally or alternatively selectively configure a pair of motors between series and parallel configurations. As a further example, the switches may convey inputs to a controller, such as subsequently described controller 114, which, responsive to inputs from the switches, configures the vehicle for a selected operating state.

As indicated in FIG. 3, drive assembly 30 may (but is not required to) further include a controller 114, which is adapted to control electronically the transmission of the rotational input from the motor assembly to the driven wheel assembly. More specifically, controller 114 includes a microprocessor or suitable control circuit that is adapted to control the actuation, or energization, of the motor assembly by the battery assembly to regulate electronically the rotational input transmitted by the motor assembly to the driven wheel assembly. Controller 114 may regulate at least one of the timing and the ramp, or rate, of application of the transmission of the rotational input after actuation of a corresponding user input device by a child sitting on seat 18. In other words, the controller delays in at least time and/or rate of transmission the rotational input to the driven wheel assembly responsive at least in part to a user input selecting the desired, or selected, rotational input. An illustrative example of a suitable controller is disclosed in U.S. Pat. No. 6,771,034, the complete disclosure of which is hereby incorporated by reference for all purposes.

As shown in FIG. 2, body 12 also includes a battery compartment 120 that is adapted to receive battery assembly 60. The battery compartment may take any of a variety of different shapes, sizes, and configurations depending on such factors as the form of vehicle 10, the portion of the vehicle's body within which the compartment is formed, and the size and shape of battery assembly 60. FIG. 2 provides graphical illustrations of several suitable non-exclusive positions for battery compartment 120.

Figure 5:
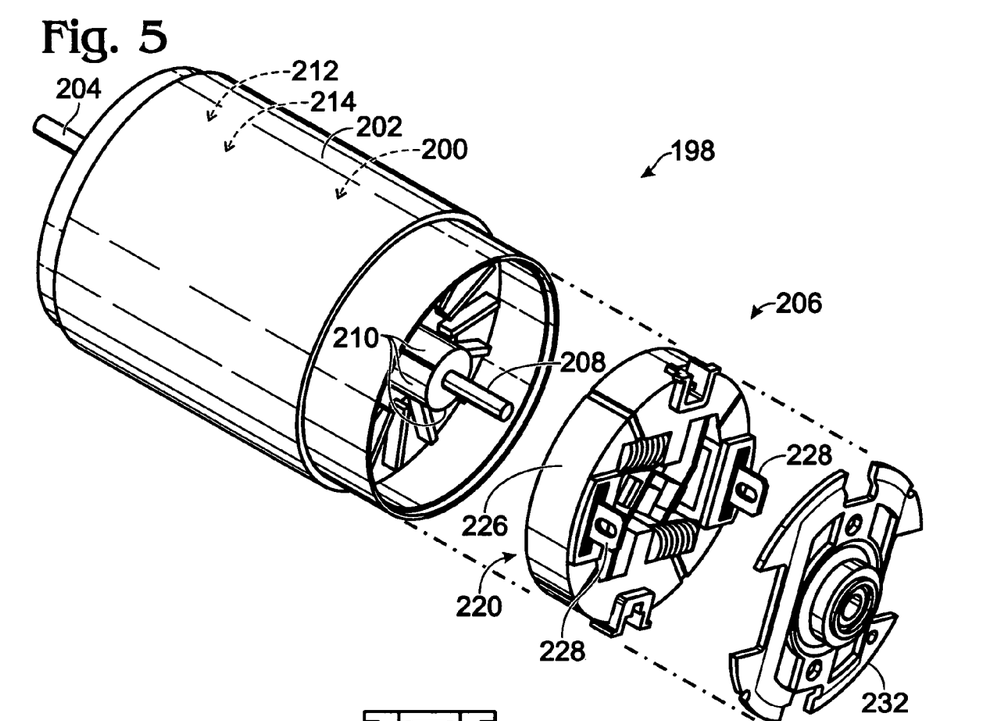
FIG. 5 is an isometric view of an exemplary motor assembly that may be employed in connection with a children's ride-on vehicle, including a noise-suppression device disposed within the motor housing.

FIG. 5 depicts an exemplary motor assembly 198 according to the present disclosure in further detail, including an electric motor 200 disposed within motor housing 202. In illustrative examples of suitable children's ride-on embodiments, motor 200 may be a high rpm (revolutions per minute), low-torque motor, which may be referred to as a miniature motor. For such motors, rated operational rpm may be in the approximate range of 6,000 to 25,000 rpm, rated operational torque may be in the range of 90 to 700 mN·m, and/or the rated power may be less than one horsepower. As used herein, "rated" refers to the range or threshold of an operating parameter for which the motor was designed to operate. Such motors commonly provide what is known as "sub-fractional" horsepower, for example in the approximate range of 0.02 to 0.50 hp, and are often implemented as Permanent Magnet Direct Current (PMDC) motors.

Additional examples of suitable rated rpms include greater than 10,000 rpm, greater than 15,000 rpm, and greater than 20,000 rpm (and optionally less than 25,000 rpm). Additional examples of rated torques include torques that are less than 700 mN·m, less than 500 mN·m, less than 300 mN·m, in the range of 500-700 mN·m, in the range of 250-700 mN·m, and in the range of 90-500 mN·m. Additional illustrative examples of rated powers include ¾ horsepower, ½ horsepower, ¼ horsepower, less than ¾ horsepower, and ¼-¾ horsepower. It is within the scope of the present disclosure that motor assemblies including the subsequently described electromagnetic noise-suppression devices, current protection devices, and/or thermal protection devices may have other rated rpm's, torques and/or powers, such as values that are larger than, smaller than, or include subranges, of those described above.

Motor 200 includes an output shaft 204 that rotates during operation to mechanically power the vehicle (e.g., by driving driven wheel assembly 28 via output linkage 100). Input 206 of motor 200 includes a rotatable input shaft 208 having plural electrical contact surfaces 210, which are electrically isolated from one another. As in the present example, output shaft 204 and input shaft 208 typically are integral parts of an elongate shaft that extends through motor housing 202.

Each contact surface 210 is electrically coupled with a corresponding coil or winding 212 disposed within motor housing 202. Each winding is secured or affixed to input shaft 208, such that the input shaft and windings (and corresponding contact surfaces) rotate together relative to motor housing 202. Motor 200 may include any number of windings 212, and a corresponding number of contact surfaces 210. For example, a three-pole motor may include three pairs of windings and contact surfaces. However, a motor having any suitable number of poles may be used, such as a two-, four-, or five-pole motor. One or more magnets 214 may be fixedly disposed within motor housing 202, so as to electromagnetically interact with the windings while the windings are being energized.

A DC power source, such as battery assembly 60, is electrically coupled to motor input 206 via an electrical contact brush arrangement that electrically couples the DC power source to contact surfaces 210 as input shaft 208 rotates. Application of the DC power source selectively energizes the windings. The induced magnetic field and permanent magnets in turn produce an electromotive torque which causes rotation of the input shaft, windings and output shaft.

In many cases it will be desirable to condition the electrical input to, or output from, motor 200. For example, in DC motor implementations, a contact brush arrangement can lead to noise or other unwanted high-frequency signal components. Rotation of the input shaft (e.g., shaft 208) causes temporary interruptions in the generated electric fields as shaft contact surfaces (e.g., surfaces 210) move between adjacent electrical brushes. These interruptions can cause arcing, which can damage the motor directly. Additionally or alternatively, these interruptions and arcing can cause the motor assembly to emit electromagnetic energy such as RF noise or other electromagnetic interference (EMI).

Figure 6:
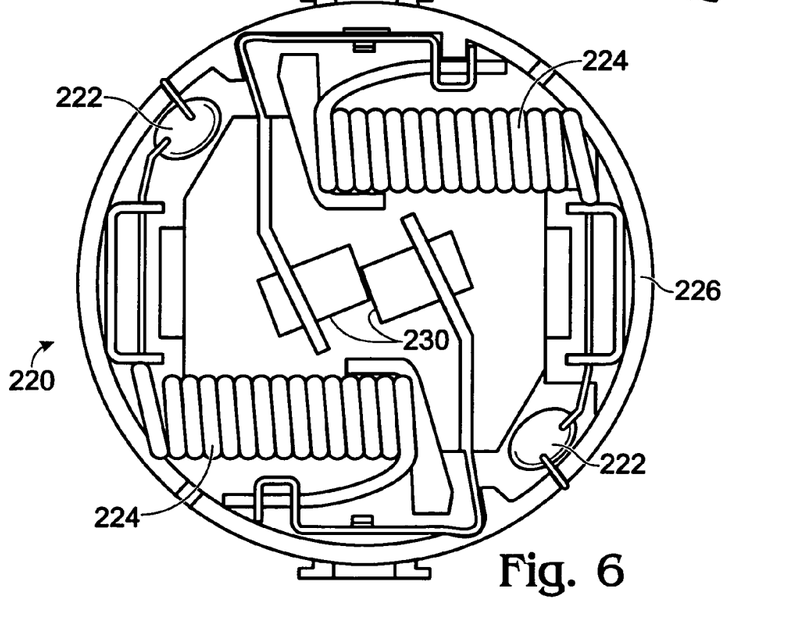
FIG. 6 is a plan view of an insert on which the noise-suppression device of FIG. 5 may be located.

Accordingly, it is within the scope of the present disclosure that motor assembly 198 may include, or be in communication with, a filter or other noise-suppression (or adsorption) device 220, as shown in FIGS. 5 and 6, that is adapted to reduce electromagnetic noise emitted by the motor assembly. Device 220 may also be referred to as an electric noise-suppression device. In the depicted example, noise-suppression device 220 is disposed and/or located within motor housing 202, so as to be in close proximity with contact surfaces 210. In other embodiments, noise-suppression device 220 may be disposed on an external surface of motor housing 202, or external but proximal to the motor housing. Because of the close proximity to contact surfaces 210, the suppression device shown in FIGS. 5-6 may provide improved noise control and does not require external mounts or wiring. Locating the device inside the motor housing may reduce the risk of damage to the noise suppressor, and the closeness of the device to the motor may reduce or eliminate the risk of noise developing on intervening electrical connections.

In the present example, noise-suppression device 220 is implemented as an electrical filter that filters out high frequency components, such that a less noisy DC signal gets delivered to windings 212, and gets returned to battery assembly 60. More particularly, noise-suppression device 220 may include one or more capacitors 222 and/or one or more inductors 224 to provide electrical filtering. As shown in FIG. 6, the capacitor and/or inductor may be provided on an optional insert 226, which may be configured to facilitate manufacture of the motor assembly and establishment of the appropriate electrical connections inside the motor housing. Any appropriate capacitance and/or inductance, or other electrical components such as resistors, diodes, and the like, to provide filtering, may be employed, depending on the system requirements and/or design preferences. Also, as shown, insert 226 may be configured to include leads 228 for the DC power source and the electrical brushes used to contact electrical contact surfaces 210 (e.g., brushes 230). Typically, as in the depicted example, the electrical brushes are carried on resilient arms that are biased inward to urge the brushes into contact with contact surfaces 210. FIG. 6 shows insert 226 before installation into the motor housing, with the resilient arms that carry the contact brushes being fully urged toward one another (the arms are spread apart during assembly/installation so that the inward-facing surfaces embrace contact surfaces 210). Insert 226 may be installed by inserting it into an open end of motor housing 202, and a cap, such as indicated at 232 in FIG. 5, may be affixed in place to close off the motor housing and/or retain insert 226 in place. As discussed, insert 226 is not required to all embodiments, and it is within the scope of the present disclosure that one or more noise-suppression devices 220 may be otherwise suitably coupled to the motor assembly within or exterior to housing 202.

Figure 7:
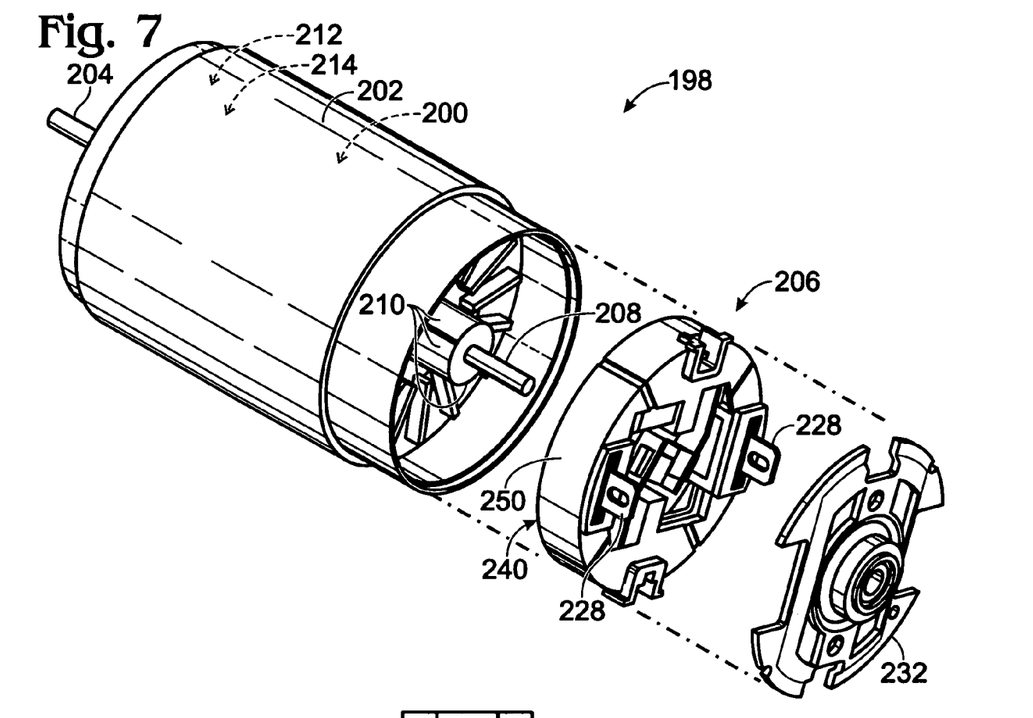
FIG. 7 is an isometric view of another exemplary motor assembly that may be employed in connection with a children's ride-on vehicle, including a cutoff device disposed within the motor housing.
Figure 8:
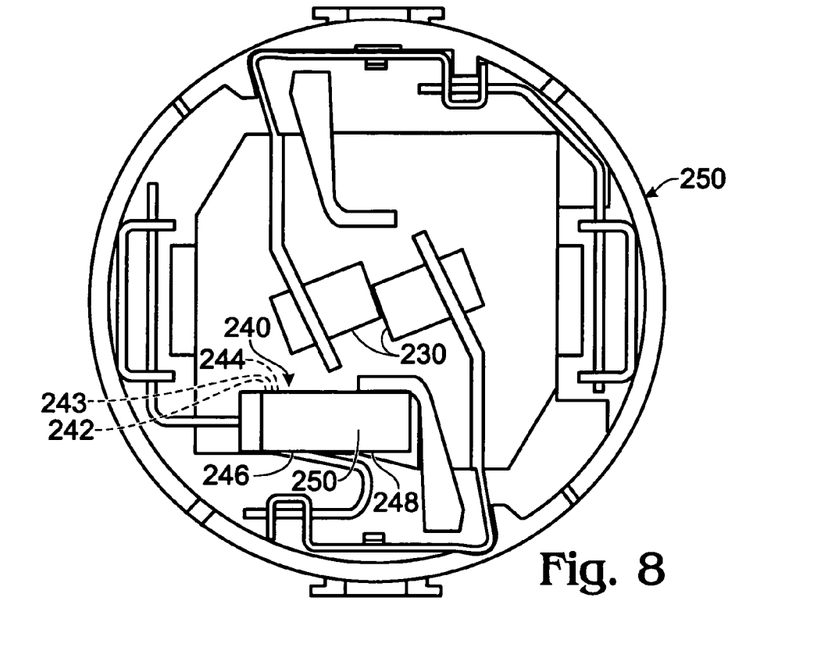
FIG. 8 is a plan view of an insert on which the cutoff device of FIG. 7 may be located.

Referring now to FIGS. 7 and 8, a cutoff device 240 that may be implemented in connection with a motor assembly will be described. FIG. 7 depicts the same motor assembly as shown in FIG. 5, but with an optional motor housing insert that includes cutoff device 240 instead of noise-suppression device 220. Cutoff device 240 may be adapted to selectively restrict operation of the motor assembly upon the detection of a temperature that exceeds a specific temperature threshold, upon the detection of a current that exceeds a specific current threshold, upon the detection of other detrimental conditions, or upon the detection of any combination of these. Cutoff device 240 may be utilized either instead of or along with a circuit breaker or fuse that is part of battery assembly 60. Children's ride-on vehicles having batteries with fuses and/or circuit breakers are described in U.S. Pat. No. 6,509,719, the complete disclosure of which is hereby incorporated by reference for all purposes.

During operation of a children's ride-on vehicle, motor 200 generates heat, which can exceed predetermined thresholds under certain circumstances. Motor malfunction, obstruction of the vehicle's motion or wheels, mechanical defects, etc. are just some of the issues that can lead to overheating of motor 200 or other portions of the vehicle. Excessive heat can lead to various challenges, including damage to the motor components such as windings that may burn or emit smoke when exposed to excessive temperatures or currents. Additionally or alternatively, these conditions may result in damage to other portions of the vehicle, such as surrounding plastic components such as fan blades or fan housings that may melt or otherwise deform.

Accordingly, cutoff device 240, as embodied by a heat-sensitive cutoff device 242, is disposed within motor assembly 198 to cut off electrical power to the motor upon overheating. In other words, the heat-sensitive cutoff device is adapted to restrict operation of the motor assembly when a temperature is detected that exceeds a threshold temperature. This threshold temperature is predetermined and selected to be a temperature below which damage to the motor assembly and/or adjacent components of the vehicle is prevented. The particular threshold temperature utilized in a particular motor assembly may vary according to such factors as the construction of the motor and/or its housing, the construction of the components of the vehicle adjacent the motor assembly, one or more of the rated operating parameters of the motor (rpm, torque, horsepower, etc.), user preferences, etc. For example, in some motors 200, plastic components may show damaging effects at temperatures exceeding 240° C. These motors may include a heat-sensitive cut-off device 242 that cuts off or otherwise restricts or interrupts power to the motor when internal temperatures are greater than a threshold temperature, illustrative (non-exclusive) examples of which include 220° C., 210° C., and 180° C. As an additional example, in some motors 200, windings 212 may show damaging effects at temperatures at or above 180° C. Such motors may include a heat-sensitive cut-off device 242 that cuts off power to the motor when internal temperatures are greater than a threshold temperature, illustrative (non-exclusive) examples of which include 170° C., 160° C., and 150° C.

Similarly, in order to protect motor assembly 198, cutoff device 240 may additionally or alternatively be embodied by a current-sensitive cutoff device 243. Operation of motor 200 at a current that is greater than a rated operational current, either instantaneously or for any extended length of time, may cause damage to components of motor 200, such as windings 212, or may cause excessive heating, which can cause the motor to overheat and the same challenges that were discussed above in reference to heat-sensitive cutoff device 242. Together with battery assemblies 60, the high-rpm, low torque electric motors that are suitable for use in a children's ride-on according to the present disclosure typically function at a current of approximately 10 amps. Accordingly, current sensitive cutoff device 243 may be configured to restrict operation of motor assembly 198 upon detection of a current of greater than a preselected threshold current, illustrative (non-exclusive) examples of which include 7, 9, 12, or 15 amps, either instantaneously or when sustained for a predetermined length of time. This time period may, but is not required to, vary with the peak current through the cutoff device. Illustrative non-exclusive examples of time periods after which a cutoff device may be adapted to restrict motor operation include less than a minute, 1-5 minutes, 2-10 minutes, 10-20 minutes, 15-30 minutes, at least 1 minute, at least 3 minutes, at least 15 minutes, at least 30 minutes, etc.

Since the temperature of an electronic device may be affected by ohmic heating, a cutoff device 240 may be designed to be sensitive to both temperature and current and thereby may be configured to be both a current-sensitive cutoff device and a temperature-sensitive cutoff device. A combination cutoff device 244 of this type may restrict operation of motor assembly 198 upon detection of a threshold temperature as described above and/or upon detection of a threshold current/time combination.

By placing the cutoff device in close proximity to components that may cause and/or may be damaged by elevated temperature and/or increased operational current (e.g., motor components), potential overheating may more easily be detected and acted upon before significant damage or risk occurs. Alternatively, a temperature-sensitive device may be placed in a convenient location and threshold temperatures detected by the cutoff device correlated with temperatures for critical components. In the depicted example, a combination cutoff device 244 embodied by thermal switch 248 is carried on an optional insert 250 that may be appropriately placed within motor housing 202. Similar to insert 226 (FIGS. 5 and 6), insert 250 may include DC power source leads 228 and inwardly-biased electrical brushes 230 for applying power to the motor windings. Due to a combination of heating within motor housing 202 and ohmic effects within the device, thermal switch 248 opens upon reaching a threshold temperature, cutting the electrical connection between the DC power source and motor 200. Switch 248 may have any suitable construction, including constructions that are resettable so that the motor assembly may be reused after the switch is reset from its open, or tripped, condition. Resettable thermal switches may be adapted to be reset manually, such as a by a user depressing a user input to reset the switch, or automatically, such as by the thermal switch automatically closing when the temperature of the switch returns below a predetermined threshold. An illustrative, non-exclusive example of an automatically resettable thermal switch, which is sensitive to excessive current as well as excessive temperature, is a bimetallic fuse 252. Non-resettable switches, or fuses, may be designed to be removed and replaced by a user so that the motor assembly may be reused upon replacement of a used fuse or other non-resettable switch. Devices that are sensitive to increases in current rather than increases in temperature, or combination devices, may be employed instead of or in addition to heat sensitive devices.

Although not required, it is within the scope of the present disclosure to include both a noise-suppression device and cutoff device disposed within the motor assembly. In such an embodiment, inserts such as inserts 226 and 250 may be employed, with appropriate provision made to establish electrical connections from the DC power source leads, through the noise-suppression and cutoff devices, to the brush set used to make contact with the rotating contact surfaces 210. As a further variation, both noise-suppression and cutoff devices may be included on a single insert and/or otherwise integrated into the motor assembly in any suitable construction.

Figure 9:
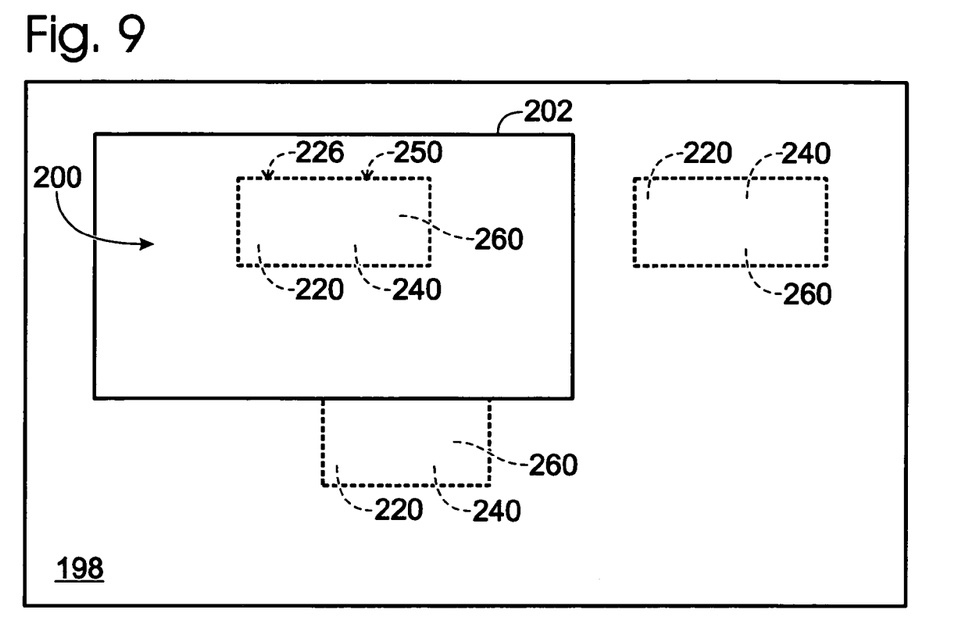
FIG. 9 is a schematic diagram of a suitable motor assembly depicting several optional locations for a noise-suppression device and/or a cutoff device within the scope of the present disclosure.

FIG. 9 shows motor assembly 198 schematically. Motor 200 is shown disposed within motor housing 202. The motor assembly may include noise-suppression device 220, cutoff device 240, or both devices, which may be disposed within motor housing 202, on an exterior surface of the motor housing, or proximal to the motor housing. In the case where motor assembly 198 includes both noise-suppression device 220 and cutoff device 240, both devices may be provided together, as a combined device 260 similar to either noise-suppression insert 226 and cutoff device insert 250. The combined device may be disposed in any of the locations illustrated in FIG. 9. If noise-suppression device 220 and cutoff device 240 are provided separately, each may be disposed in any of these locations, independent of the location of the other device. Specifically, noise-suppression device 220 may be disposed within motor housing 202 while one or more cutoff devices 240 may be disposed either on the exterior or in the proximity of motor housing 202. If disposed inside the motor housing, noise-suppression device 220 may be embodied by noise suppression insert 226, and cutoff device 240 may be embodied by cutoff device insert 250.

INDUSTRIAL APPLICABILITY

The present disclosure is applicable to children's ride-on vehicles with battery-powered motor assemblies.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A children's ride-on vehicle, comprising:
a body having at least one seat for a child;
a battery-powered motor assembly, wherein the battery-powered motor assembly comprises:
  a motor housing;
  an electric motor disposed within the motor housing; and
  at least one noise-suppression device that is within the motor housing and adapted to reduce electromagnetic noise, wherein the motor is a permanent magnet direct current motor having a rated power of less than one horsepower, a rated rpm of greater than 6000 rpm, and a rated torque of less than 700 mN·m;
at least one user input device adapted to actuate the battery-powered motor assembly;
a steering assembly including a steering mechanism adapted to receive steering inputs from a child sitting on the at least one seat;
a plurality of wheels rotatably coupled to the body, wherein the plurality of wheels includes at least one driven wheel adapted to be rotationally driven by the battery-powered motor assembly and at least one steerable wheel adapted to receive steering inputs from the steering assembly; and
a battery assembly adapted to provide power to the battery-powered motor assembly.

2. The children's ride-on vehicle of claim 1, wherein the at least one noise-suppression device is adapted to reduce electromagnetic interference.

3. The children's ride-on vehicle of claim 1, wherein the at least one noise-suppression device is adapted to reduce RF noise.

4. The children's ride-on vehicle of claim 1, wherein the motor has a rated torque of 90-700 mN·m.

5. The children's ride-on vehicle of claim 1, wherein the motor has a rated power of less than ¾ horsepower.

6. The children's ride-on vehicle of claim 1, wherein the motor assembly further includes at least one cutoff device that is within the motor housing and which is adapted to selectively restrict operation of the motor assembly.

7. The children's ride-on vehicle of claim 6, wherein the cutoff device is adapted to selectively restrict operation of the motor assembly when a temperature is detected by the at least one cutoff device that is at least as great as a threshold temperature.

8. The children's ride-on vehicle of claim 7, wherein the at least one cutoff device includes a resettable thermal switch.

9. The children's ride-on vehicle of claim 6, wherein the cutoff device is adapted to selectively restrict operation of the motor assembly when a current is detected by the at least one cutoff device that is at least as great as a threshold current.

10. The children's ride-on vehicle of claim 9, wherein the cutoff device is adapted to selectively restrict operation of the motor assembly when a current detected by the at least one cutoff device that is at least as great as a threshold current is sustained for a predetermined length of time.

11. The children's ride-on vehicle of claim 1, wherein the at least one noise-suppression device includes at least one capacitor.

12. The children's ride-on vehicle of claim 1, wherein the at least one noise-suppression device includes at least one inductor.

13. The children's ride-on vehicle of claim 1, wherein the at least one noise-suppression device includes at least one capacitor and at least one inductor.

14. The children's ride-on vehicle of claim 1, wherein the at least one noise-suppression device is disposed within the motor housing.

15. The children's ride-on vehicle of claim 1, wherein the at least one noise-suppression device is mounted on the exterior of the motor housing.

16. The children's ride-on vehicle of claim 1, wherein the at least one noise-suppression device is disposed proximal to the motor housing.

17. A children's ride-on vehicle, comprising:
a body having at least one seat for a child;
a battery-powered motor assembly, wherein the battery-powered motor assembly comprises:
 a motor housing;
 an electric motor disposed within the motor housing; and
 at least one cutoff device that is adapted to selectively restrict operation of the motor assembly responsive to at least one of a temperature at the motor that is at least as great as a threshold temperature and a current at the motor that is at least as great as a threshold current;
at least one user input device adapted to actuate the battery-powered motor assembly;
a steering assembly including a steering mechanism adapted to receive steering inputs from a child sitting on the at least one seat;
a plurality of wheels rotatably coupled to the body, wherein the plurality of wheels includes at least one driven wheel adapted to be rotationally driven by the battery-powered motor assembly and at least one steerable wheel adapted to receive steering inputs from the steering assembly; and
a battery assembly adapted to provide power to the battery-powered motor assembly.

18. The children's ride-on vehicle of claim 17, wherein the cutoff device is adapted to selectively restrict operation of the motor assembly when a temperature is detected by the at least one cutoff device that is at least as great as a threshold temperature.

19. The children's ride-on vehicle of claim 18, wherein the at least one cutoff device includes a resettable thermal switch.

20. The children's ride-on vehicle of claim 19, wherein the thermal switch is adapted to automatically reset upon detection of a temperature that does not exceed the threshold temperature.

21. The children's ride-on vehicle of claim 19, wherein the thermal switch is adapted to be manually reset.

22. The children's ride-on vehicle of claim 19, wherein the thermal switch includes a bimetallic fuse.

23. The children's ride-on vehicle of claim 17, wherein the cutoff device is adapted to selectively restrict operation of the motor assembly when a current is detected by the at least one cutoff device that is at least as great as a threshold current.

24. The children's ride-on vehicle of claim 17, wherein the cutoff device is adapted to selectively restrict operation of the motor assembly when a current detected by the at least one cutoff device that is at least as great as a threshold current is sustained for a predetermined length of time.

25. The children's ride-on vehicle of claim 17, wherein the at least one cutoff device is disposed within the motor housing.

26. The children's ride-on vehicle of claim 17, wherein the at least one cutoff device is mounted on the exterior of the motor housing.

27. The children's ride-on vehicle of claim 17, wherein the at least one cutoff device is disposed proximal to the motor housing.

28. The children's ride-on vehicle of claim 17, wherein the motor is a permanent magnet direct current motor having a rated power of less than one horsepower, a rated rpm of greater than 6000 rpm, and a rated torque of less than 700 mN·m.

29. The children's ride-on vehicle of claim 28, wherein the motor further includes at least one noise-suppression device within the motor housing and which is adapted to reduce electromagnetic noise.

30. A children's ride-on vehicle, comprising:
a body having at least one seat for a child;
a battery-powered motor assembly, wherein the battery-powered motor assembly comprises:
 a motor housing;
 an electric motor disposed within the motor housing, wherein the electric motor includes at least a pair of brushes; and
 at least one noise-suppression device that is adapted to reduce electromagnetic noise, wherein the at least one noise-suppression device is connected in series with all the brushes included in the electric motor;
at least one user input device adapted to actuate the battery-powered motor assembly;
a steering assembly including a steering mechanism adapted to receive steering inputs from a child sitting on the at least one seat;
a plurality of wheels rotatably coupled to the body, wherein the plurality of wheels includes at least one driven wheel adapted to be rotationally driven by the battery-powered motor assembly and at least one steerable wheel adapted to receive steering inputs from the steering assembly; and
a battery assembly adapted to provide power to the battery-powered motor assembly.

31. The children's ride-on vehicle of claim 30, wherein the motor assembly further includes at least one cutoff device that is adapted to selectively restrict operation of the motor assembly when a temperature associated with the motor is detected by the at least one cutoff device that is at least as great as a threshold temperature.

* * * * *